US011641422B2

(12) United States Patent
Goodsitt et al.

(10) Patent No.: US 11,641,422 B2
(45) Date of Patent: May 2, 2023

(54) SYSTEMS AND METHODS FOR INTEGRATED THIRD-PARTY CALLBACKS

(71) Applicant: Capital One Services, LLC, McLean, VA (US)

(72) Inventors: Jeremy Goodsitt, Champaign, IL (US);
Galen Rafferty, Mahomet, IL (US);
Reza Farivar, Champaign, IL (US);
Vincent Pham, Champaign, IL (US);
Anh Truong, Champaign, IL (US);
Mark Watson, Sedona, AZ (US);
Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 135 days.

(21) Appl. No.: 17/346,384

(22) Filed: Jun. 14, 2021

(65) Prior Publication Data
US 2022/0400178 A1    Dec. 15, 2022

(51) Int. Cl.
*H04W 76/10*    (2018.01)
*H04W 12/06*    (2021.01)
*H04M 3/523*    (2006.01)
*H04W 4/50*    (2018.01)
*H04W 4/02*    (2018.01)
*H04W 4/20*    (2018.01)

(52) U.S. Cl.
CPC ......... *H04M 3/5231* (2013.01); *H04W 4/023* (2013.01); *H04W 4/20* (2013.01); *H04W 4/50* (2018.02); *H04W 12/06* (2013.01); *H04W 76/10* (2018.02)

(58) Field of Classification Search
CPC ..... H04M 3/5231; H04W 4/50; H04W 76/10; H04W 4/023; H04W 4/20; H04W 12/06
See application file for complete search history.

(56) References Cited

U.S. PATENT DOCUMENTS

| 6,047,071 | A | 4/2000 | Shah |
| 7,359,714 | B2 | 4/2008 | Parupudi et al. |
| 10,554,786 | B2 | 2/2020 | Andrews et al. |
| 11,200,535 | B1 * | 12/2021 | Greenbaum ......... G06Q 10/087 |
| 11,367,323 | B1 * | 6/2022 | Shahidzadeh ............ G07C 9/37 |
| 11,425,525 | B2 * | 8/2022 | Guha ..................... H04W 4/023 |
| 11,483,711 | B2 * | 10/2022 | Jin ........................ H04W 12/42 |
| 2009/0311963 | A1 | 12/2009 | Haverty |
| 2013/0214909 | A1 * | 8/2013 | Meijers ................. H04W 4/029 340/10.5 |
| 2018/0139580 | A1 * | 5/2018 | Guha .................... H04W 4/023 |
| 2020/0106877 | A1 * | 4/2020 | Ledvina ............... H04W 12/06 |

(Continued)

*Primary Examiner* — Khawar Iqbal
(74) *Attorney, Agent, or Firm* — Banner & Witcoff, Ltd.

(57) ABSTRACT

Aspects described herein may allow for deploying third-party callback to be performed on a mobile device. For example, the mobile device may configure a third-party callback to be performed after a triggering event is detected by a remote device. The triggering event may relate to a remote device associated with the mobile device. A determination may be made as to whether the mobile device is within a pre-determined proximity of the remote device. If the two devices are in proximity and if the mobile device receives a message that indicates the triggering event has been detected, the mobile device may perform the third-party callback. In this way, a user's need to request services conveniently and accurately is facilitated.

20 Claims, 6 Drawing Sheets

(56) References Cited

U.S. PATENT DOCUMENTS

| | | | | |
|---|---|---|---|---|
| 2020/0130090 A1* | 4/2020 | Bonnell | ............... | B23K 9/0956 |
| 2022/0030381 A1* | 1/2022 | Wender | ............... | H04L 12/1818 |
| 2022/0164429 A1* | 5/2022 | Searl | ................. | G06Q 20/3278 |
| 2022/0253798 A1* | 8/2022 | Klein | ....................... | G06T 11/00 |
| 2022/0347584 A1* | 11/2022 | Zimring | ................ | A63F 13/355 |
| 2022/0366397 A1* | 11/2022 | Gaudin | .................. | G06Q 20/20 |

* cited by examiner

SYSTEMS AND METHODS FOR INTEGRATED THIRD-PARTY CALLBACKS

FIELD OF USE

Aspects of the disclosure relate generally to electronic devices. More specifically, aspects of the disclosure may provide for systems and methods for deploying third-party callbacks to be performed after a triggering event occurs.

BACKGROUND

Users may request services provided by third parties with their mobile devices. For example, with a smartphone, a user may request a taxi service when arriving at an airport. A user may want to configure the service request on the user's smartphone in advance (e.g., before the user arrives at the airport) even if the precise time of when the user will need the service is uncertain. A user may also want to reduce the chance of accidentally requesting a service (e.g., accidentally press a button on the smartphone). Thus, systems and methods to conveniently and accurately request services are needed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a computer-implemented method for automatically performing a third-party callback on a mobile device to facilitate a user's need to request a service conveniently and accurately. In at least one embodiment, a third-party callback to be performed by a mobile device is configured. The third-party callback may be performed after a triggering event is detected by a remote device associated with the mobile device. A determination may be made as to whether the mobile device is within a predetermined proximity of the remote device. If the mobile device and the remote device are within the pre-determined proximity and the mobile device receives, from the remote device, a message indicating that the triggering event has been detected, an authentication request to authenticate the message may be sent. A response indicating the message is authenticated may be received. The mobile device may perform, based on the message and the response, the third-party callback. The mobile device may also send, to the remote device, a confirmation that the third-party callback has been performed. For example, performing the third-party callback may comprise opening an application on the mobile device and sending, through the application and to a third party, a service request. For example, the triggering event may comprise authentication of a bio-metric on the remote device. For another example, the triggering event may comprise the remote device has entered a geographical location. For example, the triggering event may comprise an input command associated with the mobile device made on the remote device. The message may indicate that the input command has been made on the remote device.

In some instances, a connection may be established between the mobile device and the remote device, and the message may be received via the connection. For example, the connection may be established by receiving, by the mobile device and from the remote device, a ping packet, and sending, by the mobile device and to the remote device, a reply.

In some instances, the determination that the mobile device is within a pre-determined proximity to the remote device comprises broadcasting, by the mobile device and with a low transmission power, a connection request, and receiving, by the mobile device and from the remote device, a reply.

The message sent by the mobile device may include a token in some cases. The token may be sent to a remote platform to authenticate the message.

The determination that the mobile device is within a predetermined proximity to the remote device comprises receiving, by the mobile device and from the remote device, an indication that indicates a local network that the remote device is currently connected, and determining, by the mobile device and based on the indication, that the mobile device is connected to the same local network.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer-readable media for deploying third-party callbacks.

Before discussing these concepts in greater detail, however, several examples of a computing device that may be used in implementing and/or otherwise providing various aspects of the disclosure will first be discussed with respect to FIG. 1.

Figure 1:
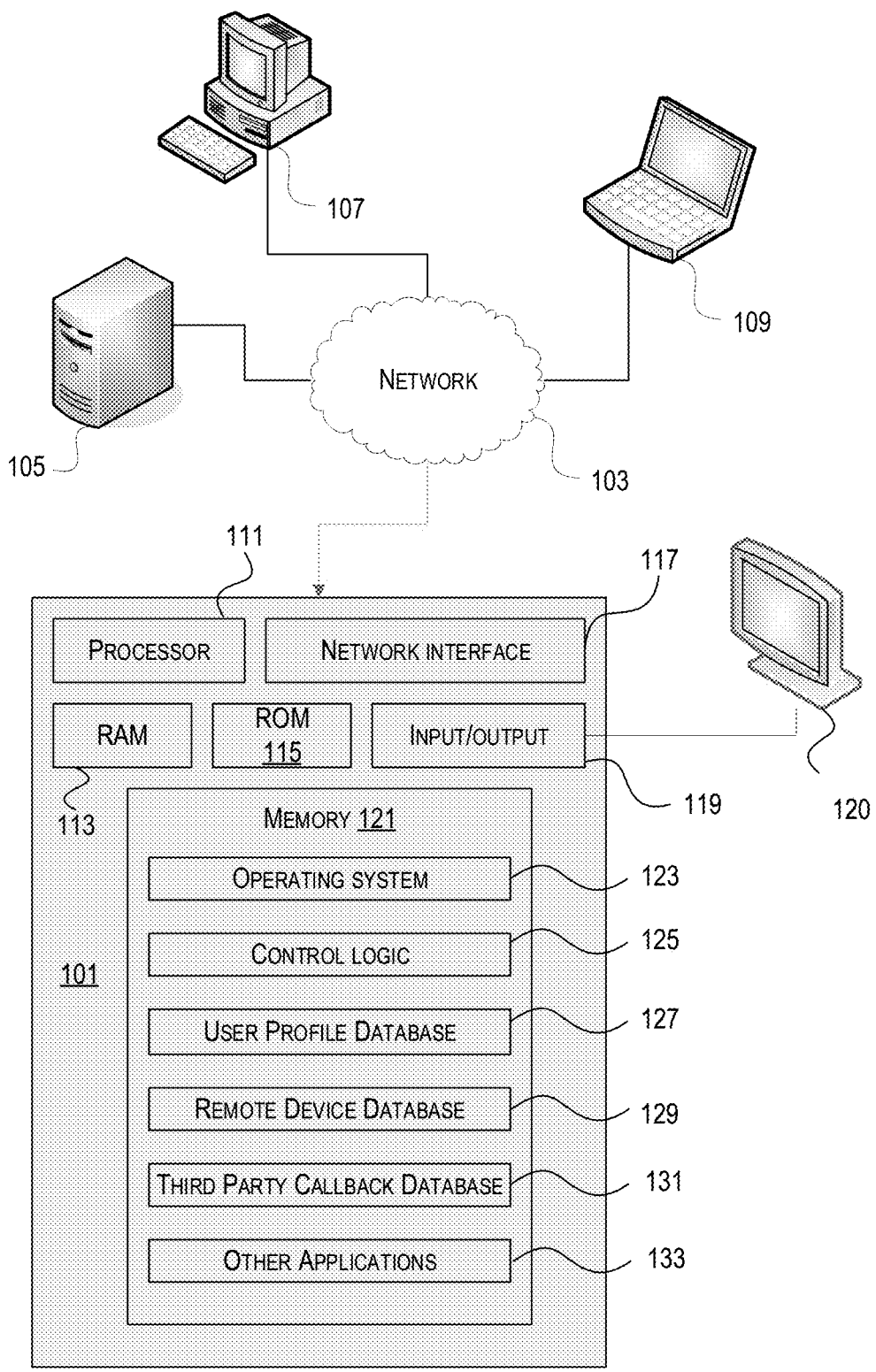
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smartphone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associating detecting triggering event, authenticating messages, performing third-party callbacks, and/or other functions described herein. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling the overall operation of the computing device 101, control logic 125 for instructing computing device 101 to perform aspects discussed herein. Furthermore, memory 121 may store various databases and applications depending on the particular use, for example, user profile database 127, remote device database 129, third-party callback database 131, and other applications 133 may be stored in a memory of a computing device used at a server system that will be described further below. Control logic 125 may be incorporated in and/or may comprise a linking engine that updates, receives, and/or associates various information stored in the memory 121 (e.g., user identifiers, remote device identifiers, third-party associated information, authentication information, etc.). In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer-readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field-programmable gate arrays (FPGA), and the like. Particular data structures may be used to more effectively implement one or more aspects discussed herein, and such data structures are contemplated within the scope of computer-executable instructions and computer-usable data described herein. Various aspects discussed herein may be embodied as a method, a computing device, a data processing system, or a computer program product.

Figure 2:
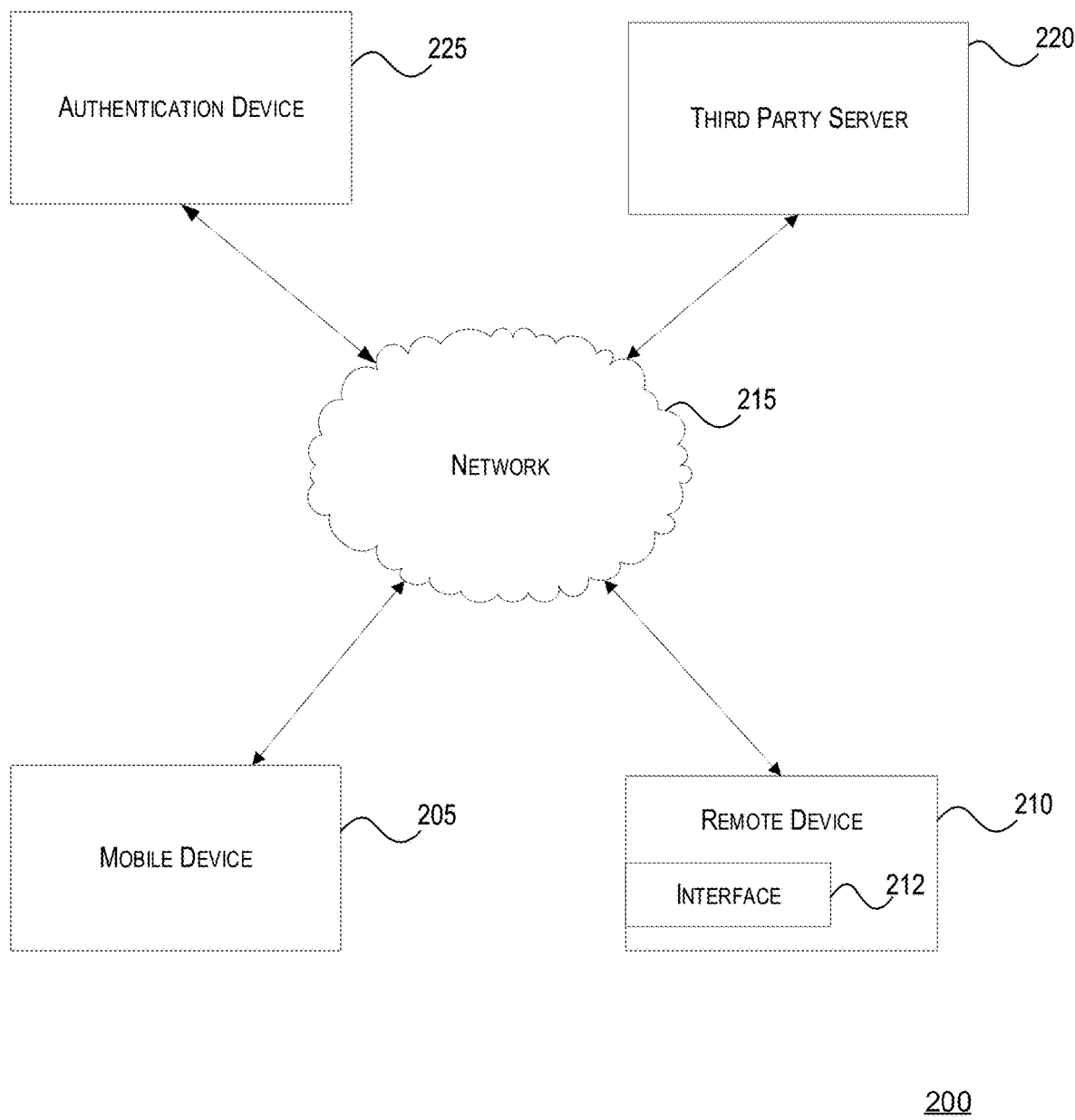
FIG. 2 depicts an example network environment in accordance with one or more illustrative aspects discussed herein.

FIG. 2 depicts an illustrative computing environment for enabling third-party callbacks in accordance with one or more example embodiments. Referring to FIG. 2, computing environment 200 may include one or more computer systems. For example, computing environment 200 may include a mobile device 205, a remote device 210, a third-party server 220, and an authentication device 225. Each of the mobile device 205, remote device 210, third-party server 220, and authentication device 225 may be computing device 101 in FIG. 1.

Each of the mobile device 205, remote device 210, third-party server 220, and authentication device 225 are in communication via a network 215. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 1.

The mobile device 205 may be configured to perform third-party callback after certain triggering events have been detected as described herein. Remote device 210 may be configured to detecting such triggering events and communicate with the mobile device 205 as described herein. The remote device 210 may comprise an interface 212 to detect the triggering event as described in greater detail below. For example, if the triggering event is an authentication of the user's biometric information, the interface 212 may be an interface to obtain the input of a biometric. For example, the interface 212 may be a camera to obtain the user's facial image, or a fingerprint input interface to obtain the user's fingerprint. For example, if the triggering event is an input on the remote device 210, the interface 212 may be a keyboard or an input button. Authentication device 225 may be configured to store a variety of authentication data, such as the users' biometrics, passwords, authentication tokens, etc. The authentication device 225 may be a physical device (for example, a cloud server) that is separated from both the mobile device 205 and the remote device 210, or the authentication device 225 may be a hardware or software computing component on the same physical device with either the mobile device 205 or the remote device 210. Third-party server 220 may be configured to communicate with mobile device 205 and perform third-party callback requested by mobile device 205 as described herein.

Access to a particular server system may be limited to a particular device. Some or all of the data described herein may be stored using one or more data stores. Datastores may include but are not limited to relational databases, hierarchical databases, distributed databases, in-memory databases, flat file databases, XML databases, NoSQL databases, graph databases, and/or a combination thereof. Any file system may be used to store data using a database and/or flat file as appropriate. The network 215 may include a local area network (LAN), a wide area network (WAN), a wireless telecommunications network, and/or any other communication network or combination thereof.

The data transferred to and from various computing devices in computing environment 200 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the computing environment 200. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the computing environment 200 in front of one or more computing devices such that any external devices may communicate directly with the specialized hardware.

Figure 3A:
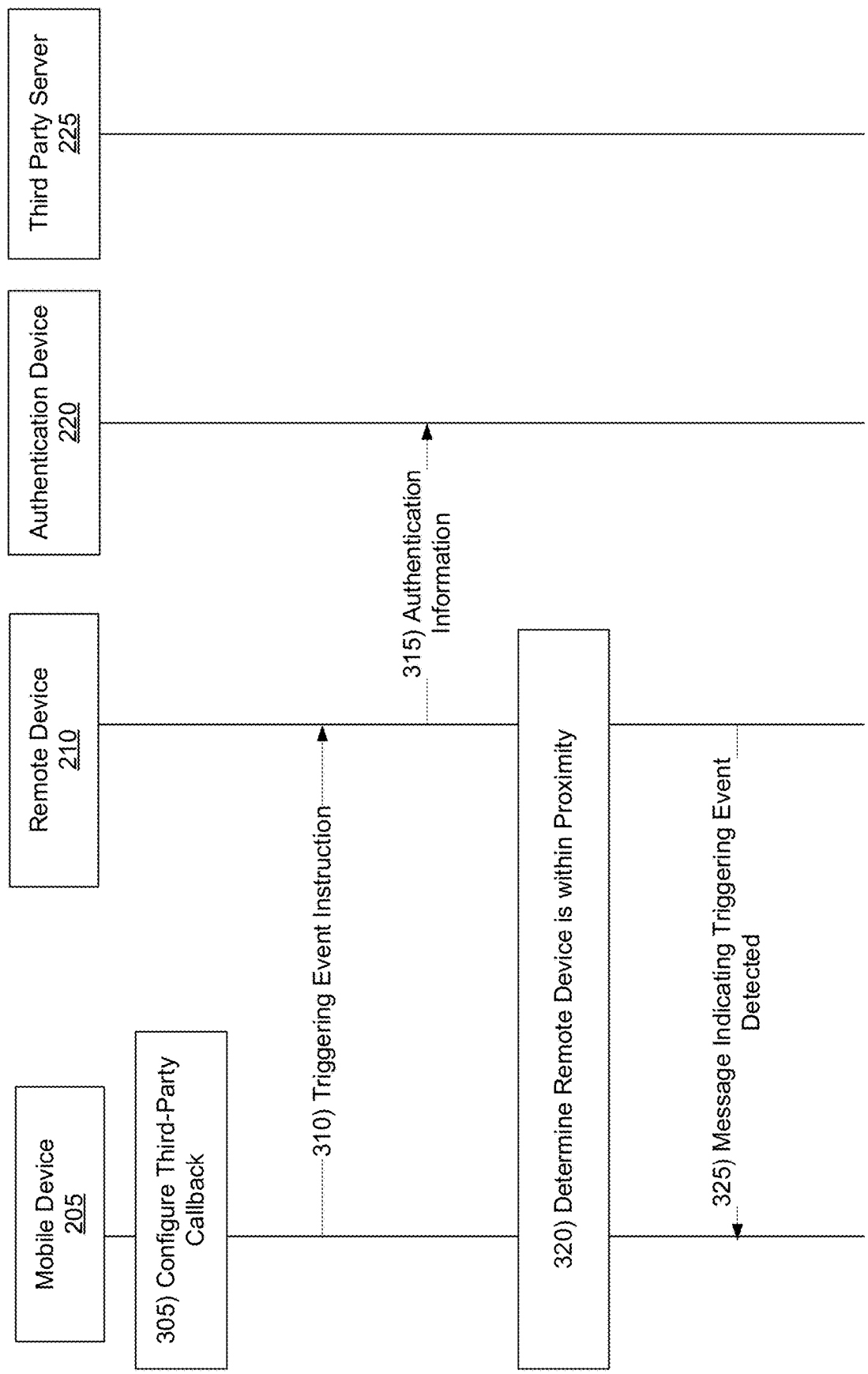
FIGS. 3A-3B are sequence diagrams depicting exemplary processes for deploying third-party callbacks in accordance with one or more illustrative aspects discussed herein.
Figure 3B:
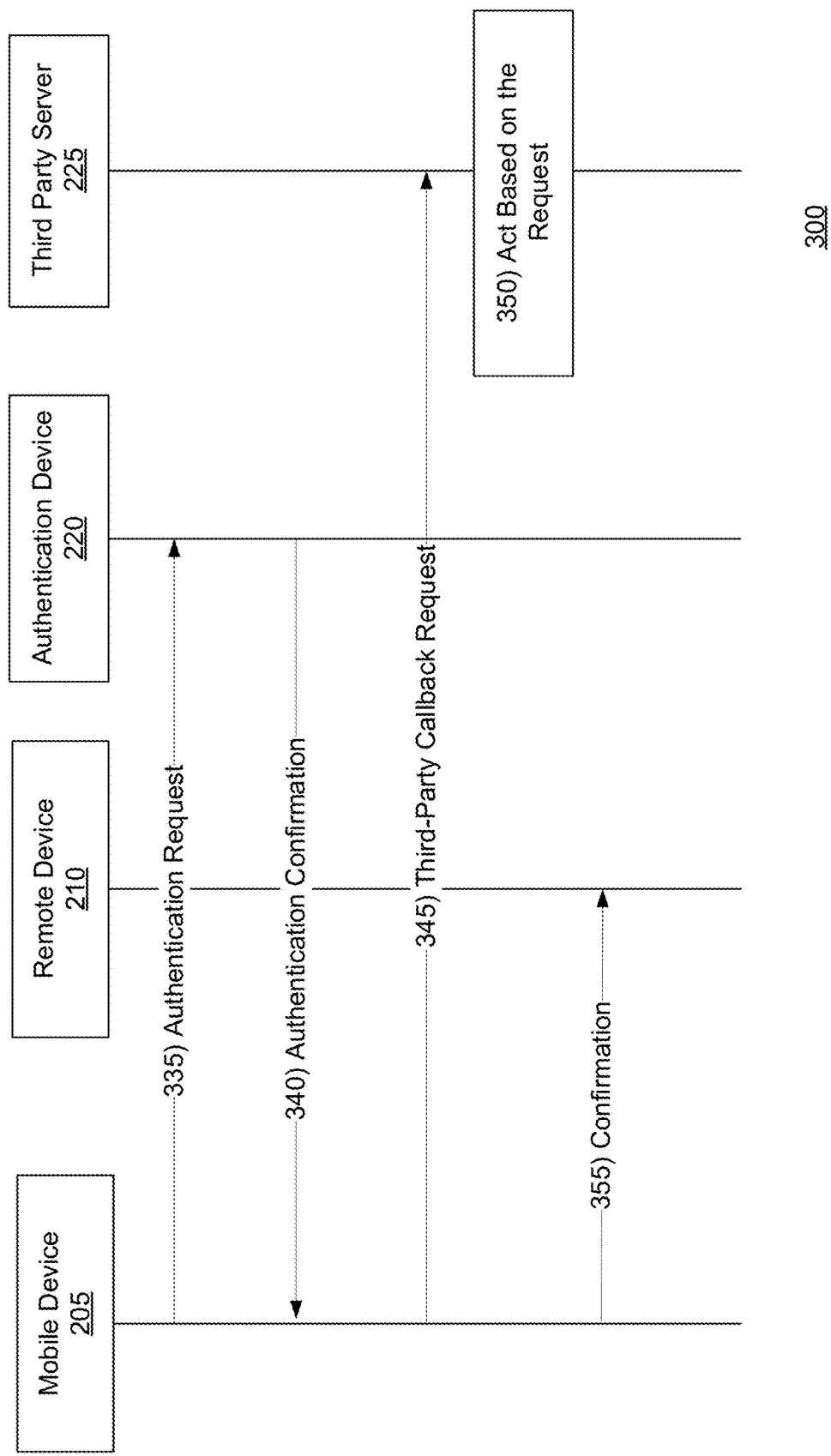

FIGS. 3A-3B are sequence diagrams depicting processes for deploying third-party callbacks. The steps of the method 300 may be performed by the mobile device 205, remote device 210, third-party server 220, and authentication device 225, as shown in FIG. 2. Alternatively or additionally, some or all of the steps of the method 300 may be performed by one or more other computing devices. The steps of the method 300 may be modified, omitted, and/or performed in other orders, and/or other steps added.

At step 305, a configuration may be made to configure a third-party callback to be performed by the mobile device 205 (e.g., a smartphone of the user). The third-party callback may be performed after a triggering event is detected by the remote device 210. The third-party callback may be performed by opening an application on the mobile device 205 and sending, via the application, a service request to a third party. The configuration may be made by the user via a graphical user interface on the mobile device 205. The configuration may comprise determining the remote device 210 that is used to detect the triggering event, configuring the triggering event, and configuring the third-party callback to be performed.

To better explain the operation of the system, consider the following non-limiting example where a user arrives at an airport wishing to arrange transportation from the airport. In this scenario, a third party could be a transportation service operator (e.g., a taxi service operator). The third-party callback may be a request to have a taxi pick the user up at a specific time and location. The third-party callback may be performed by opening an application on the mobile device 205 and sending, via the application, a taxi service request to the taxi service operator. However, due to the possibility of delays or changes in itinerary, etc., the user may be unable to specify a specific time for being picked up. The user may configure a third-party callback to be performed after the user has collected the checked luggage at the airport. In such instances, the remote device 210 may be a wireless fob attached to the user's luggage. Alternatively, the remote device 210 may also be a computing device that is installed in the airport next to the luggage claim station. If a triggering event described below is detected by the remote device 210, it may indicate that the user has collected the user's checked luggage.

Another example where third-party callback may be useful relates to online shopping. Consider, for example, a user who wishes to prevent the accidental purchase of items on a website (e.g., by children, unauthorized users, etc.). In such a scenario, the third party may be an online shopping vendor, and the third-party callback may be a request to purchase an item from that vendor. The remote device 210 may be a smartwatch of the user.

To configure the remote device 210 that is used to detect the triggering event, the mobile device 205 may display a list of device identifiers associated with one or more remote device 210 via a graphical user interface to the user. If the identifiers of more than one remote device 210 are listed, the user may choose which remote device 210 to use to detect the triggering event.

The list of device identifiers for the one or more remote device 210 may be obtained by the mobile device 205 via a connection between the mobile device 205 and each of the one or more remote device 210. Consistent with the example where the remote device 210 may be a fob that the user may attach to the luggage when the user departs to the airport, the mobile device 205 may connect with the fob via Bluetooth and obtain an identifier (e.g., a name) of the fob.

In a variety of aspects, the list of device identifiers of the one or more remote device 210 may be obtained by the mobile device 205 via a remote server that stores the information of the remote devices 210. Consistent with the example where the remote device 210 may be a computing device that is installed in the airport next to the luggage claim station, a remote server may store the list of a plurality of remote devices 210 each installed at a different airport. The mobile device 205 may communicate with the remote server to obtain the list of the plurality of remote devices 210, so that the user may choose one remote device 210 that is located at the airport the user plans to go to.

The mobile device 205 may also display a list of one or more types of triggering events for the user to choose from. The triggering events may take many forms. For example, triggering events may comprise authentication of biometric information on the remote device 210. Biometric information may comprise any physical or behavioral human characteristics that are considered unique to an individual and may be used to digitally identify that individual. For example, biometric information may comprise fingerprints, facial patterns, voice or typing cadence, any other biometrics, or a combination of multiple types of biometrics. The remote device 210 may comprise an interface 212 to obtain the biometric information. For example, the interface 212 may be a camera to acquire facial patterns or a fingerprint reader to acquire a fingerprint. In such a scenario, configuring the triggering event may comprise inputting the user's biometric information.

The triggering event may comprise a determination that the remote device 210 has entered a geographical location, as determined by a global positioning system (GPS) component on the remote device 210. Continuing with the airport example described above, if the remote device 210 is a wireless fob on the luggage, the geographical location may be a certain area of the airport, for example, the luggage claim area of the airport.

The triggering event may also be an input command on the remote device 210. In this scenario, a user could provide input command at the remote device 210 (e.g., by entering a password). In instances where the remote device 210 is associated with multiple mobile devices (such as when the same remote device 210 is a computing device installed next to the luggage claim station and serves multiple users), the input command may also comprise an indication that this particular input is associated with the mobile device 205. For example, the indication may comprise a user ID and/or device ID.

The triggering event may also comprise a particular time range (e.g., a particular date and/or time of the day) during which the triggering event is supposed to occur. In the airport example described above, the particular time range may be a time range during which the user is expected to arrive at the airport.

The triggering event may include one or a combination of any number of the examples described above. Other triggering events are also possible.

At step 310, the mobile device 205 may send a triggering event instruction to the remote device 210. The triggering event instruction may comprise a user ID of the user, a device ID of the mobile device 205, and/or any information regarding the triggering event. For example, the device ID may be an Internet Protocol (IP) address or a media access control (MAC) address of the mobile device 205. The device ID may be a unique identifier that identifies the mobile device 205. Information regarding the triggering event may comprise the type of triggering event the remote device 210 needs to detect, and/or information that may be needed by the remote device 210 to detect the triggering event (e.g., a password, certain parameters relating to the user's biometric information, or a GPS location). After receiving the triggering event instruction, the remote device 210 may store the information in the triggering event instruction in a user profile based on the ID of the user or the mobile device 205.

At step 315, the authentication information may be sent from the remote device 210 to an authentication device 225. For example, the authentication information may comprise a token to authenticate the remote device 210. For another example, the authentication information may comprise authentication information (e.g., biometric information) of the user. This may be particularly useful if the authentication information is relatively complicated while remote device 210 is a thin computing device that has relatively less computing capacity. For example, this may be useful if the triggering event is a facial recognition of the user's face, while the remote device 210 is a wireless fob attached to the luggage that may not have enough computing capacity to conduct the facial recognition.

At step 320, a determination may be made as to whether the mobile device 205 and the remote device 210 are within a pre-determined proximity. The determination may be made by either the mobile device 205 or by the remote device 210. After the mobile device 205 and/or the remote device 210 determine the two devices are within proximity, it may notify the other device of the determination.

Consistent with the airport example described above, before the user goes to the airport, the user may attach the remote device 210 to the user's luggage and bring the user's mobile device 205 (e.g., mobile phone) with the user. The luggage may be checked in at the departure airport and transported separately. When the user gets off the airplane at the arrival airport, the luggage may be transported, by the airport staff and separately from the user, to the luggage claim station. Throughout this process, the remote device 210 may be in some distance away from the mobile device 205. During that period of time when the remote device 210 and the mobile device 205 are a distance away from each other, if the user accidentally presses a button on the mobile device 205 to call for the taxi, or if the remote device 210 falsely detects a triggering event for any reason, the mobile device 205 may decline to request the taxi service based on the mobile device 205 and the remote device 210 not in proximity. This may be useful, for example, if the triggering event is simply pressing a button on the remote device 210, and the airport staff who is responsible to transport the luggage accidentally presses the button.

The determination as to whether the mobile device 205 and the remote device 210 are within pre-determined proximity may be made in multiple possible ways. In some cases, the determination may be made by broadcasting a connection request with a low transmission power so that only devices that are within certain proximity may receive the connection request. If the connection request is responded to, it may be determined that the mobile device 205 and the remote device 210 are within proximity. In these cases, the broadcasting may be made either by the mobile device 205 or by the remote device 210. The connection request may be a Bluetooth connection request, an RFID exchange, etc. In some instances, the mobile device 205 broadcasts the connection request and then receives a reply from the remote device 210. The mobile device 205 may then determine, based on an identifier in the request that identifies the remote device 210, that the mobile device 205 is within a predetermined proximity of the remote device 210. Similarly, if the remote device 210 broadcasts the connection request, the mobile device 205 may receive the connection request, and determine, based on an identifier in the request that identifies the remote device 210, that the mobile device 205 and remote device 210 are within proximity. The mobile device 205 may then reply to the remote device 210 to establish the connection.

The determination as to whether the mobile device 205 and the remote device 210 are in proximity may be made based on whether the mobile device 205 and the remote device 210 are both connected to the same local network, for example, the same Wi-Fi network. For example, a connection may be established between the mobile device 205 and the remote device 210 using the network addresses, for example, IP addresses, of the two devices. After the connection is established, the remote device 210 may send a message that comprises a network identifier of the local network to which the remote device 210 is connected. For example, the network identifier may be a service set identifier (SSID) of the local network. The mobile device 205 may compare the SSID that the remote device 210 sent with the SSID the mobile device 205 is currently connected with. If the two SSIDs are the same, the mobile device 205 may determine that the mobile device 205 and remote device 210 are in a predetermined proximity to each other. Other ways to determine the mobile device 205 and the remote device 210 are in proximity are possible.

At step 325, the remote device 210 may send a message indicating the triggering event is detected by the remote device 210. The remote device 210 may start to detect the triggering event after it is determined that the mobile device 205 and the remote device 210 are proximate to each other. For example, when the mobile device 205 and remote device 210 are still far away from each other, the remote device 210 may be in an energy-saving mode. This may be useful to avoid falsely detecting the triggering event. For example, consistent with the airport example, if the airport staff presses an input button on the remote device 210, the user may not want to receive the message because the user may not have reached the luggage claim station. However, if the remote device 210 determines not to start the detection of the triggering event based on the remote device 210 not being within proximity of the mobile device 205, the false detection may not have occurred. Other times to start detecting the triggering event are possible. For example, the remote device 210 may be ready to detect the triggering event at any time if the remote device 210 is turned on.

The message may be sent if the remote device 210 determines that the triggering event is detected. As described above, the triggering event may be configured based on the triggering event instruction received at step 310. For example, if the triggering event is the remote device 210 enters a geographic area, then the message may be sent if the remote device 210 determines that the remote device 210 enters into the geographic area.

The message may comprise an indicator, for example, a value of "1" in a designated portion of the payload of the message. The indicator may indicate the triggering event has been detected. The message may also comprise a token that may be used by the mobile device 205 to authenticate the remote device 210. As discussed above, if the triggering event involves authentication of a user's biometric information while the remote device 210 does not have the computing capacity to do the authentication, the message may also comprise the input biometric information that is acquired by the remote device 210 so that the mobile device 205 may authenticate such information. The mobile device 205 may receive the message, for example, via the connection established between the mobile device 205 and the remote device 210.

At step 335, the mobile device 205 may send an authentication request to the authentication device 225 to authenticate the message received at step 325, for example, to ensure the message is not from a false source. For example, the authentication request may comprise the token sent from the remote device 210 at step 325. In the example that an input biometric information needs to be authenticated, the biometric information may also be sent to the authentication device 225.

At step 340, the authentication device 225 may send an authentication confirmation to the mobile device 205 if the identity of the remote device 210 and/or the input biometric information is authenticated. For example, the authentication device 225 may have a database that stores a user profile to authenticate the user's biometric information, and may have a device profile to authenticate the remote device 210. After the mobile device 205 receives the authentication confirmation, the method may proceed to step 345.

At step 345, the mobile device 205 may perform the third-party callback by opening an application on the mobile device 205 and sending the third-party callback request to the third-party server 220. For example, the opening the application and sending the third-party callback request may be based on the configuration at step 305. For example, when the user arrives at the airport and picks up the user's luggage, a request for a taxi service may be sent to a third-party server 220 owned by the taxi service operator. The request may comprise information associated with the third-party callback. For example, a GPS location information of the mobile device 205 for the taxi to determine where to pick the user up.

At step 350, after the third-party callback request is received by the third-party server 220, the third-party server 220 may act based on the request. For example, the third-party server 220 may send a notification to a taxi driver to pick up the user at the location based on the GPS location in the request.

At step 355, the mobile device 205 may send a confirmation to the remote device 210 to indicate that the third-party callback has been performed. After the remote device 210 receive the confirmation, the remote device 210 may discontinue monitoring the triggering event. For example, the remote device 210 may enter a standby mode so that energy may be saved. If the remote device 210 does not receive any confirmation during a time period after the remote device 210 sends the message at step 325, the remote device 210 may resend the message to the mobile device 205.

Figure 4:
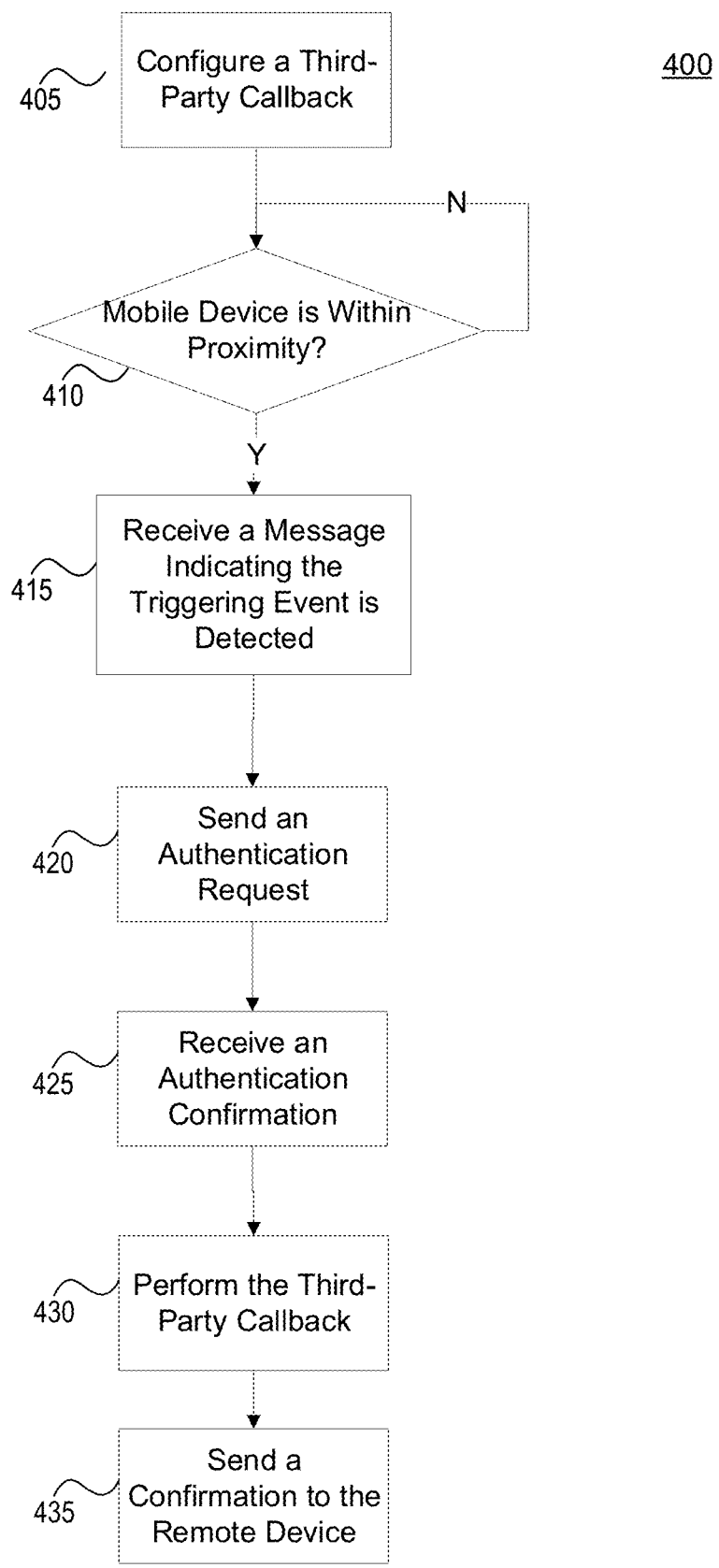
FIG. 4 is a flow diagram of an example method for deploying third-party callbacks in accordance with one or more illustrative aspects discussed herein.

FIG. 4 is a flow diagram depicting a method for deploying third-party callbacks in accordance with one or more illustrative aspects discussed herein. The steps in the method 400 may be performed by one or more of the mobile device 205, remote device 210, third-party server 220, and/or authentication device 225, as shown in FIG. 2. The method 400 may be used by the mobile device 205 depicted in FIGS. 3A-3B to interact with other computing devices depicted in FIGS. 3A-3B. The steps of the method 400 may be modified, omitted, and/or performed in other orders, and/or other steps added as appropriate.

At step 405, the mobile device 205 may configure a third-party callback to be performed after a triggering event is detected by the remote device 210. For example, the triggering event, the third-party callback, and the way to configuring the third-party callback may be similar to as depicted in FIGS. 3A-3B.

At step 410, the mobile device 205 may determine that the mobile device 205 is within a pre-determined proximity of the remote device 210. For example, step 410 may be performed similarly as may be depicted at step 320. If the mobile device 205 determines that the remote device 210 is not within the predetermined proximity, step 410 may be repeated periodically. If the mobile device 205 determines that the remote device 210 is within the predetermined proximity, the method may proceed to step 415.

At step 415, the mobile device 205 may receive a message that indicates the triggering event is detected. The message may be a message depicted at step 325 from the remote device 210.

At step 420, the mobile device 205 may send an authentication request to authenticate the message. The authentication request may be an authentication request depicted at step 335. The authentication request may be sent to the authentication device 225 in FIGS. 3A-3B.

At step 425, the mobile device 205 may receive an authentication confirmation indicating the message is authenticated.

At step 430, the mobile device 205 may perform, based on the message and the authentication confirmation, the third-party callback. The mobile device 205 may perform the third-party callback by opening an application and sending a third-party callback request as depicted at step 345.

At step 435, the mobile device 205 may send a confirmation to the remote device 210. The confirmation may indicate that the third-party callback has been performed. For example, the mobile device 205 may send the confirmation in a way similar to as depicted in step 355.

Figure 5:
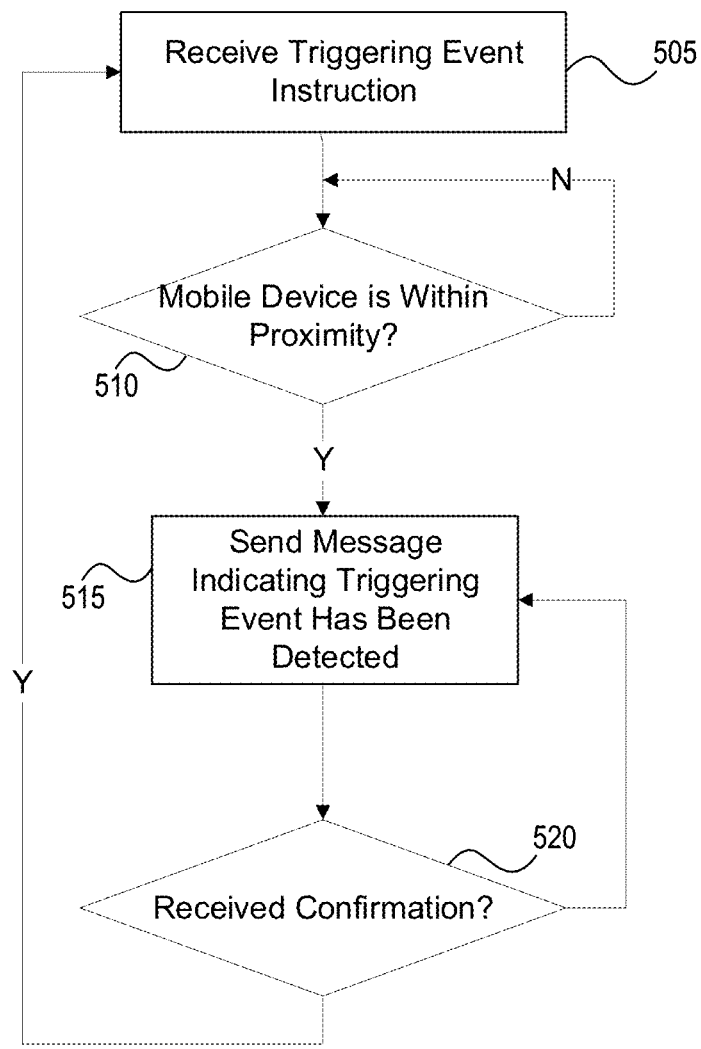
FIG. 5 is a flow diagram of an example method for deploying third-party callbacks in accordance with one or more illustrative aspects discussed herein.

FIG. 5 is a flow diagram depicting a method 500 for deploying third-party callbacks in accordance with one or more illustrative aspects discussed herein. The steps in the method 500 may be performed by a system comprising the mobile device 205, remote device 210, third-party server 220, and authentication device 225, as shown in FIG. 2. The method 500 may be used by the remote device 210 to interact with other computing devices depicted in FIGS. 3A-3B. The method 500 may be used by the remote device 210 to interact with computing devices (e.g., mobile device 205) depicted in FIG. 4. The steps of the method 500 may be modified, omitted, and/or performed in other orders, and/or other steps added as appropriate.

At step 505, the remote device 210 may receive a triggering event instruction. For example, the instruction may be received from the mobile device 205. The triggering event instruction may be a triggering event instruction depicted in FIGS. 3A-3B.

At step 510, the remote device 210 may determine that the mobile device 205 is within a pre-determined proximity of the remote device 210. At step 410, the remote device 210 may perform this determination similarly as described above at step 320. If the remote device 210 determines that the mobile device 205 is not within the predetermined proximity, step 510 may be repeated periodically. If the remote device 210 determines that the mobile device 205 is within the predetermined proximity, the method may proceed to step 515.

At step 515, the remote device 210 may send a message indicating the triggering event has been detected. The detection of the triggering event and the sending of the message may be in a way similar to as described at step 325.

At step 520, the remote device 210 may determine whether a confirmation is received from the mobile device 205. The confirmation may indicate the third-party callback will be or has been performed by the mobile device 205. The confirmation may be a confirmation described at step 355. If the remote device 210 determines that the confirmation is received, the method may return to step 505 to receive new triggering event instructions. If the remote device 210 determines that the confirmation is not received during a time period after the message is sent out, the method may return to step 515 and the message may be resent to the mobile device 205.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the scope of the invention should be determined not by the embodiments illustrated, but by the appended claims and their equivalents.

What is claimed is:

1. A method comprising:
configuring, by a mobile device, a third-party callback to be performed after a triggering event is detected by a remote device associated with the mobile device;
determining, by the mobile device, that the mobile device is within a pre-determined proximity of the remote device;
receiving, by the mobile device and from the remote device, a message indicating that the triggering event has been detected;
sending, by the mobile device, an authentication request to authenticate the message;
receiving, by the mobile device, a response indicating the message is authenticated;
performing, by the mobile device and based on the message and the response, the third-party callback; and
sending, by the mobile device and to the remote device, a confirmation that the third-party callback has been performed.

2. The method of claim 1, wherein the triggering event comprises authentication of biometric information on the remote device.

3. The method of claim 1, wherein the triggering event comprises a determination that the remote device has entered a geographical location.

4. The method of claim 1, wherein the message indicates an input command associated with the mobile device has been made on the remote device.

5. The method of claim 1, wherein the receiving, by the mobile device and from the remote device, a message indicating that the triggering event has been detected comprises:

establishing a connection between the mobile device and the remote device; and receiving the message through the connection.

6. The method of claim 5, wherein the establishing a connection between the mobile device and the remote device further comprises:

receiving, by the mobile device and from the remote device, a ping packet; and sending, by the mobile device and to the remote device, a reply.

7. The method of claim 1, wherein the determining that the mobile device is within a pre-determined proximity to the remote device comprises:

broadcasting, by the mobile device and with a low transmission power, a connection request; and receiving, by the mobile device and from the remote device, a reply.

8. The method of claim 1, wherein the message further comprises a token, wherein the sending, by the mobile device, an authentication request further comprises:

sending the token to a remote platform to authenticate the message.

9. The method of claim 1, wherein the determining that the mobile device is within a predetermined proximity to the remote device comprises:

receiving, by the mobile device and from the remote device, an indication that indicates a local network that the remote device is currently connected; and determining, by the mobile device and based on the indication, that the mobile device is connected to the same local network.

10. The method of claim 1, wherein the performing the third-party callback comprises:

opening an application on the mobile device; and sending, through the application and to a third party, a service request.

11. A mobile device comprising:

one or more processors; and memory configured to store computer instructions that, when executed by the one or more processors, cause the mobile device to perform actions comprising:

configuring, a third-party callback to be performed after a triggering event is detected by a remote device associated with the mobile device;

determining, that the mobile device is within a pre-determined proximity of the remote device;

receiving, from the remote device, a ping packet;

sending to the remote device, a reply to establish a connection between the mobile device and the remote device;

receiving, through the connection, a message indicating that the triggering event has been detected;

sending an authentication request to authenticate the message;

receiving a response indicating the message is authenticated;

performing, based on the message and the response, the third-party callback; and sending, to the remote device, a confirmation that the third-party callback has been performed.

12. The mobile device of claim 11, wherein the computer instructions are configured to cause the mobile device to determine that the mobile device is within a pre-determined proximity to the remote device by performing actions comprising:

broadcasting, by the mobile device and with a low transmission power, a connection request; and receiving, by the mobile device and from the remote device, a reply.

13. The mobile device of claim 11, wherein the message comprises a token, wherein the computer instructions are configured to cause the mobile device to send the authentication request by performing actions comprising:

receiving, from the remote device, a token; and sending, to a remote platform, the token to authenticate the message.

14. The mobile device of claim 11, wherein the computer instructions are configured to cause the mobile device to determine that the mobile device is within a predetermined proximity to the remote device by performing actions comprising:

receiving, from the remote device, an indication that indicates a local network that the remote device is currently connected; and determining, based on the indication, that the mobile device is connected to the same local network.

15. The mobile device of claim 11, wherein the computer instructions are further configured to cause the mobile device to perform the third-party callback by performing actions comprising:

opening an application on the mobile device; and sending, through the application and to a third party, a service request.

16. A non-transitory computer-readable medium storing computer instruction that, when executed by one or more processors, cause performance of actions comprising:

configuring a third-party callback to be performed after a triggering event is detected by a remote device associated with a mobile device;

receiving, from the remote device, an indication that indicates a local network that the remote device is currently connected to;

determining, based on the indication, that the mobile device is connected to the same local network;

determining, based on the determination that the mobile device is connected to the same local network, that the mobile device is within a pre-determined proximity of the remote device;

receiving, from the remote device, a message indicating that the triggering event has been detected;

sending an authentication request to authenticate the message;

receiving a response indicating the message is authenticated;

performing, based on the message and the response, the third-party callback; and sending, to the remote device, a confirmation that the third-party callback has been performed.

17. The non-transitory computer-readable medium of claim 16, wherein the computer instructions are configured to receive the message indicating that the triggering event has been detected by causing performance of actions comprising:

establishing a connection between a mobile device and the remote device; and receiving the message through the connection.

18. The non-transitory computer-readable medium of claim 17, wherein the computer instructions are configured to establish the connection between the mobile device and the remote device by causing performance of actions comprising:

receiving, from the remote device, a ping packet; and sending, to the remote device, a reply.

19. The non-transitory computer-readable medium of claim 16, wherein the message comprises a token, and wherein the computer instructions are configured to send an authentication request by causing performance of actions comprising:

sending the token to a remote platform to authenticate the message.

20. The non-transitory computer-readable medium of claim 16, wherein the computer instructions are configured to perform the third-party callback by cause performance of actions comprising:

opening an application on the mobile device; and sending, through the application and to a third party, a service request.

\* \* \* \* \*